United States Patent [19]

Schulze, Sr.

[11] 3,964,271

[45] June 22, 1976

[54] AIR CONDITIONING SYSTEM MOUNTING ARRANGEMENT FOR A MOBILE HOME

[75] Inventor: James L. Schulze, Sr., Middletown, Ky.

[73] Assignee: General Electric Company, Louisville, Ky.

[22] Filed: Mar. 6, 1975

[21] Appl. No.: 555,799

[52] U.S. Cl. .................... 62/239; 62/237; 62/259; 62/298; 62/448; 296/28 R
[51] Int. Cl.² ............................................ B60H 3/04
[58] Field of Search ................ 62/77, 237, 239, 262, 62/448, 449, 450, 259, 298; 296/28 R; 248/249

[56] References Cited
UNITED STATES PATENTS

| | | | |
|---|---|---|---|
| 2,525,869 | 10/1950 | Corhanidis | 62/129 |
| 2,914,927 | 12/1959 | Corhanidis | 62/237 |
| 3,206,943 | 9/1965 | Rice et al. | 62/302 |
| 3,254,914 | 6/1966 | Steck | 296/28 R |
| 3,453,839 | 7/1969 | Sabin | 62/237 |
| 3,566,614 | 3/1971 | Imral | 62/262 |
| 3,712,078 | 1/1973 | Maynard et al. | 62/448 |
| 3,792,895 | 2/1974 | Paulson | 296/28 R |

*Primary Examiner*—William F. O'Dea
*Assistant Examiner*—Larry I. Schwartz
*Attorney, Agent, or Firm*—Frank P. Giacalone; Francis H. Boos

[57] ABSTRACT

The present invention provides an air conditioning system for a mobile home. The system includes securing a mounting means to the support structure of the mobile home and an air conditioning unit that is adapted to be removably secured to the mounting means. When installed on the mounting means, the air conditioning unit is aligned to deliver conditioned air into the interior of the mobile home through its built-in air distribution system.

3 Claims, 8 Drawing Figures

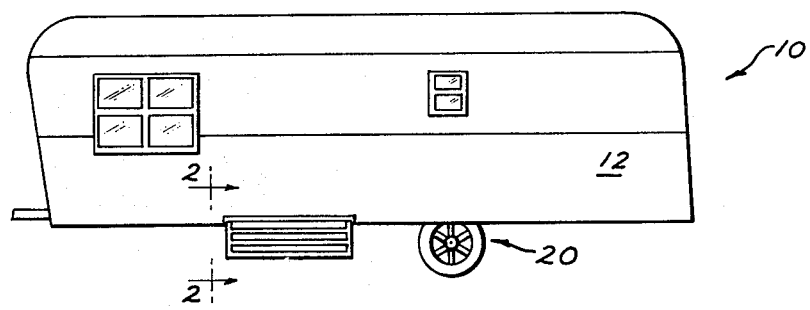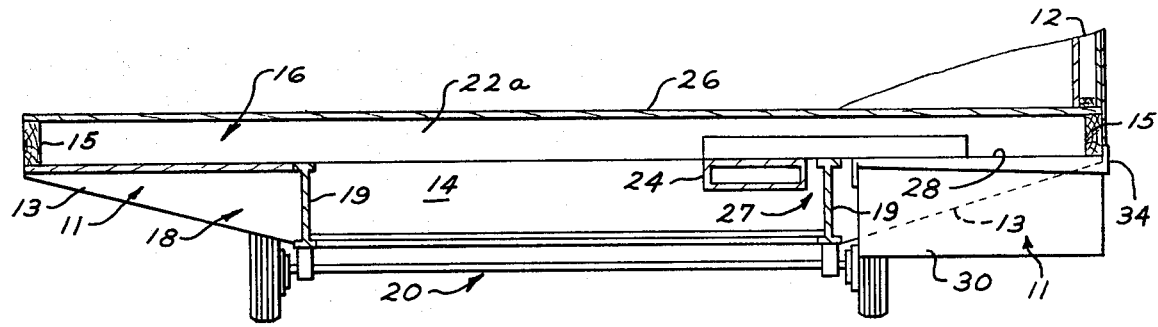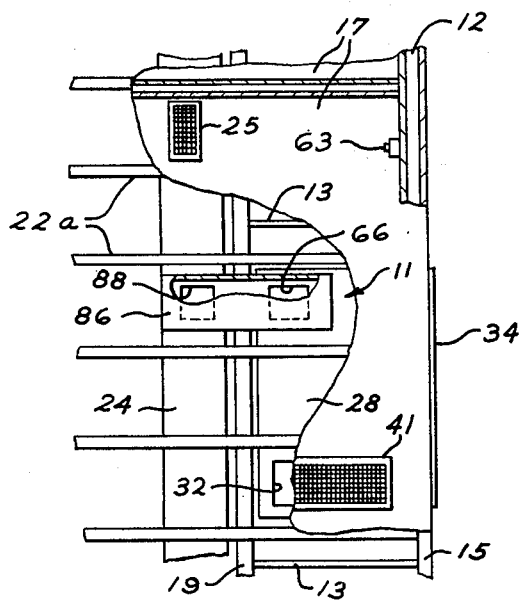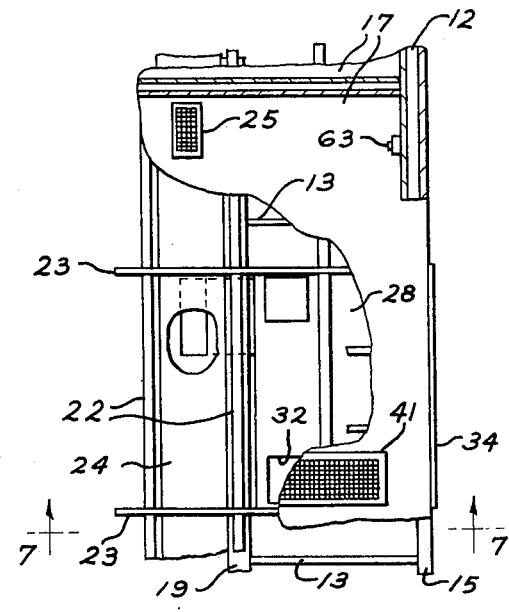

AIR CONDITIONING SYSTEM MOUNTING ARRANGEMENT FOR A MOBILE HOME

FIELD OF THE INVENTION

The present invention relates to an air conditioning system to be used in a mobile home and more particularly to an air conditioning unit that is adapted to deliver air to the interior of the mobile home through its own built-in air distribution system. Provision is made during construction of the mobile home to accommodate a mounting or adaptor means that is located in the support structure of the mobile home and arranged to communicate with the air distribution system of the mobile home. When properly located in the mounting means, the air delivery outlet of the air conditioning unit is aligned to deliver air to the air distribution system of the mobile home.

The air conditioning unit when used is removably secured to the mounting means with its air outlet and inlet areas positioned to deliver air into the mobile home air distribution system.

DESCRIPTION OF THE PRIOR ART

Traditionally, air conditioning units when used in mobile homes require the use of cumbersome, flexible duct work to connect the unit into the air distribution system of the mobile home. In many installations, the exposed flexible duct work would be installed in a manner that would be considered unsightly but, more importantly, they are delicate and are therefore susceptible to physical damage.

U.S. Pat. No. 3,566,614-Imral provides a low-profile air conditioning unit that may be positioned under the mobile home. However, when the air conditioning unit, as taught in the above patent, is placed under the mobile home, the unit must then be connected into the mobile home air distribution system, which is an additional expense in both material and labor. Furthermore, the unit must still be connected by either the customary light-weight, delicate, flexible ducting or the more expensive rigid, sheet-metal ducting which when used would have to be fabricated and dimensioned for each installation requirements.

U.S. Pat. No. 3,712,078-Maynard provides a refrigeration unit including two covers, one solid and the other having a plurality of openings that are adapted to be used as inlet and outlet openings for circulating air from a removably mounted refrigeration unit into a refrigerator cabinet. The covers are dimensioned to be interchangeably secured to the bottom or top of the refrigeration unit, so that it may be positioned to supply refrigerated air upwardly when it is located in the bottom of the cabinet or downwardly when it is located above the cabinet.

U.S. Pat. No. 3,206,943-Rice et al shows a refrigeration unit arranged or adapted to be removably positioned in the bottom of a refrigerator cabinet. The refrigeration unit package is provided with rollers that cooperatively engage a track positioned on the cabinet wall that permits locating the refrigeration inlet and outlet openings into proper alignment with appropriate air distribution flues in the refrigerator cabinet.

While both of the above-mentioned U.S. Pat. Nos. 3,712,078 and 3,206,943 provide removably arranged refrigeration units relative to refrigeration cabinets, it should be noted, however, that the present invention is not shown nor taught wherein a mounting means is provided that allows securing of an adaptor plate to a wide variety of mobile home support structures.

U.S. Pat. No. 2,525,869-Corhanidis discloses a refrigeration system that is removably mounted on a railroad car. The refrigeration unit is received in rails that are mounted on a frame that in turn is inserted into the floor of the chamber to be cooled. The frame has inlet and outlet ports formed therein. The chamber to be cooled may be provided with a conduit for receiving and distributing the cooled air. The above patent does not show nor teach the provision of a mounting means that can be used with a wide variety of floor configurations as is the case in mobile home construction practices.

The construction of the mobile home support structures relative to the partitions separating the zones together with the various sizes of the zones would make the system disclosed in the above cited patents impractical.

The present invention provides an adaptor plate installed in the mobile home during its construction and, optionally, at some later or subsequent time, an air conditioning unit that is adapted to be removably received in the adaptor means may be supplied and installed in the adaptor plate in alignment and cooperation with the air distribution system of the mobile home in a plurality of mobile home floor configurations.

SUMMARY OF THE INVENTION

By the present invention, there is provided an air conditioning system for use in a mobile home having a base structure including a floor, and longitudinally extending spaced parallel support beams located inwardly of the outer walls of the mobile home for providing a support area therebetween. An air distribution duct located between the support beams includes an air outlet for receiving air from the air conditioning unit and an air outlet for delivering air into the mobile home.

An air conditioning unit is removably attached to the base structure and includes a cabinet having air moving means, an air delivery outlet, and a return outlet in the top wall of the cabinet.

A mounting arrangement including an adaptor plate is attached in the support area and removably receives the air conditioning unit. The adaptor plate is provided with a first opening aligned with the air delivery outlet and a second opening aligned with the air return outlet when the air conditioning unit is located in the adaptor plate. The mounting arrangement includes a first passageway positioned around the second opening.

The rear edge portion of the adaptor plate is vertically positioned on the base structure relative to the mobile home floor. Support elements are secured between the adaptor plate and the base structure forward of the rear edge of the plate for positioning the adaptor plate horizontally relative to the mobile home floor and for locating the upper free edge of the first passageway vertically to a position adjacent the mobile home floor.

It is therefore an object of the invention to provide a system for air conditioning a mobile home and to removably receive a self-contained air conditioning unit.

BRIEF DESCRIPTION OF THE DRAWINGS

FIG. 1 is a side elevational view of a typical mobile home adapted with the present system;

FIG. 2 is a partial sectional elevational view taken along lines 2—2 of FIG. 1;

FIG. 3 is a partial plan view with parts broken away showing the mobile home base structure of FIG. 2;

FIG. 4 is a plan view similar to FIG. 3 showing an alternative mobile home base structure;

DESCRIPTION OF THE PREFERRED EMBODIMENT

Figure 5:
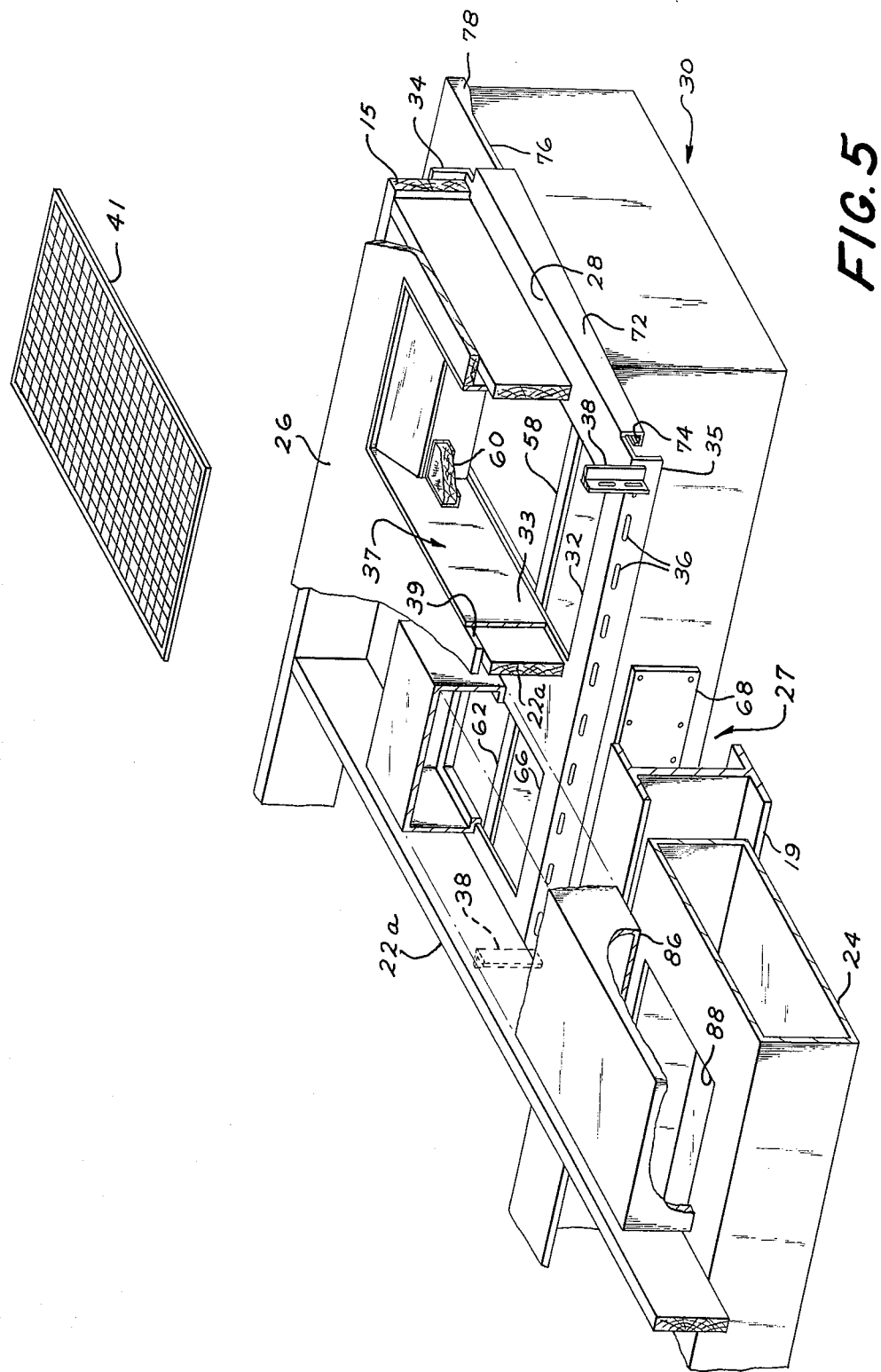
FIG. 5 is an exploded perspective view showing the mobile home base structure of FIGS. 2 and 3.

Referring now to FIGS. 1 and 2 of the drawings, a mobile home 10 having side walls 12 is supported on a base structure 14. The base structure 14 includes a floor section 16 mounted on or carried on a support frame 18 which may be mounted on a wheel assembly 20 for transporting the mobile home from one location to another.

While the base structure 14 configurations may vary with manufacturers of mobile homes, two basic and accepted forms used by manufacturers of mobile homes will herein be described in conjunction with the present invention. The support frame 18 usually includes parallel spaced main support I-beams or members 19 arranged longitudinally with respect to the mobile home 10. The beams 19 are spaced or located inwardly from the outer side walls 12 of the mobile home 10 to provide a support area 11 along both longitudinally disposed side walls 12. In order to provide adequate support for the entire width of the mobile home 10 including the support area portion 11 between the beam 19 and side walls 12, side support members 13 are spaced longitudinally and are secured to the beams 19. The side support members 13 project laterally outwardly so that the free ends are adjacent the outer edge of side walls 12 and support side beams 15 located directly under the outer walls 12.

Figure 6:
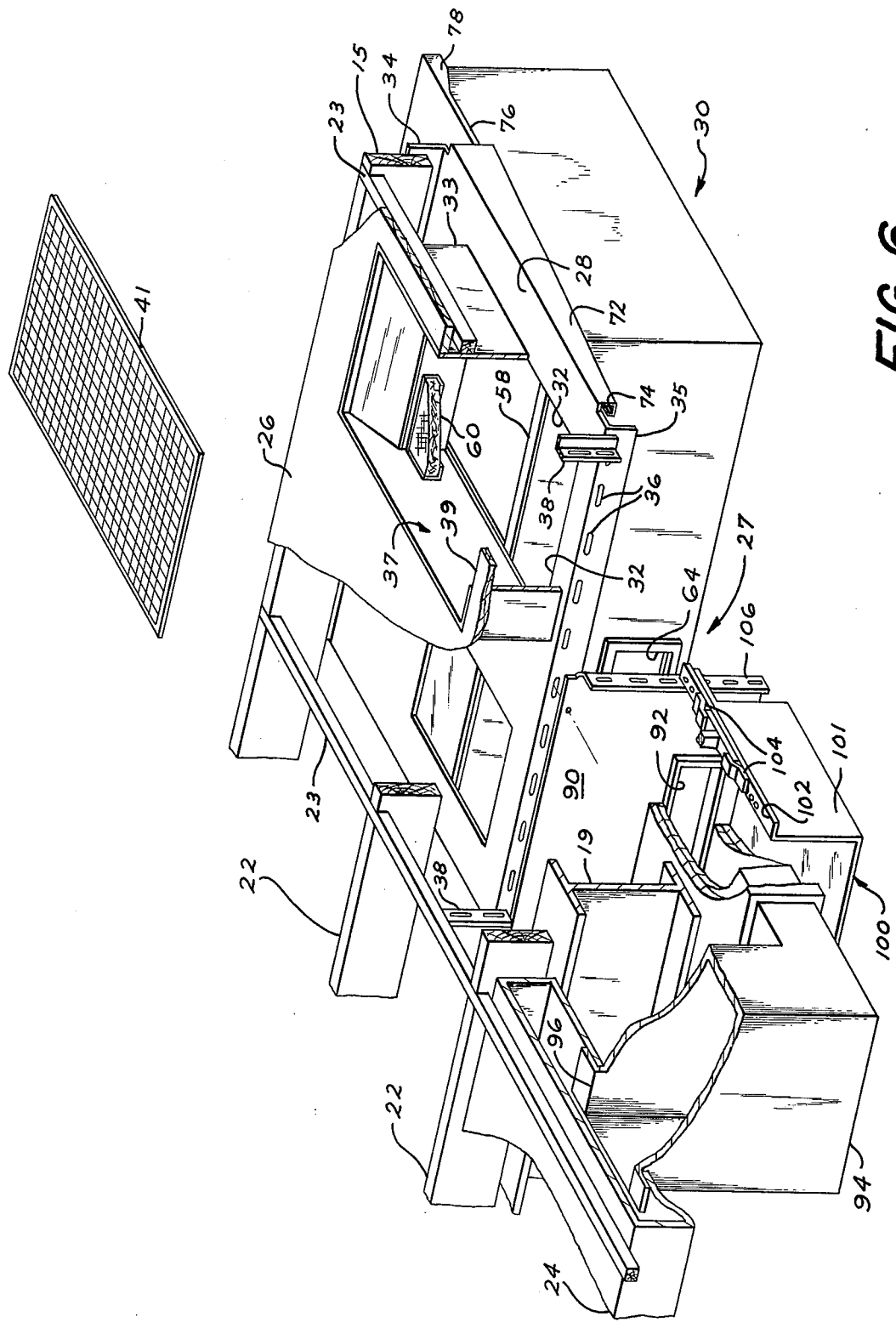
FIG. 6 is an exploded perspective view showing the mobile home base structure of FIG. 4.
Figure 7:
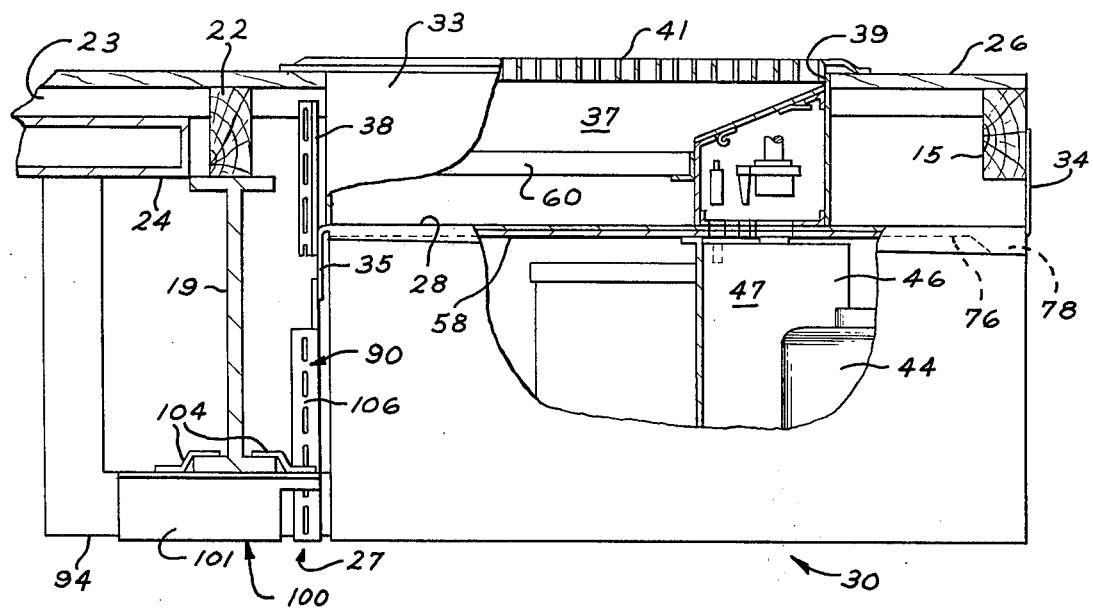
FIG. 7 is an elevational view taken along lines 7—7 of FIG. 4.

In one type of mobile home construction, the floor section 16 includes floor support members or joists 22, as shown in FIGS. 4 and 6, that are arranged parallel with the support beams 19 and side beam 15 in a spaced relationship across the width of the mobile home. In this configuration cross members 23 may be provided. The mobile home is customarily provided with a forced air heating furnace (not shown) which distributes heated air to the various rooms, or zones 17, to be heated through an air distribution system main duct 24. The duct 24 is arranged longitudinally extending usually substantially the full length of the mobile home, and may include air-delivery outlets 25 in each or selected ones of the zones 17 to be heated. In this arrangement, the air distribution system main duct 24 used in conjunction with the heating system of the mobile home 10 is arranged between floor joists 22, that is between the floor 26 of the mobile home and the upper surface of the support member 19 or may be supported below them. In another type of mobile home construction, and more specifically the floor support section 16, as shown in FIGS. 2, 3 and 5, the floor support joists or members 22A are arranged transverse to and are supported on the support member 19. The longitudinally positioned air distribution system duct 24 in this configuration is arranged below the floor joist 22A and in the plane, or between the dimension defined by the upper and lower ends of the support members 19. In either floor section configuration the distribution duct 24 is arranged in the area between the I-beams 19. While two types of mobile home floor configurations have been shown it should be noted that variations may be encountered in either type, for example it has been found that while some manufacturers employ 2 × 4 dimensioned floor joists 22 as shown in FIGS. 6 and 7, others may employ 2 × 6 dimensioned floor joists shown in FIGS. 2 and 5.

In accordance with the present invention, an air conditioning unit 30 (FIGS. 7 and 8) is adapted to be used in conjunction with the mobile home air distribution system duct 24. To this end, aligning and mounting means 27 are provided that may be used effectively in either type of floor section 16 construction and over a wide range of floor joist dimensions. The aligning means 27 includes a mounting means or adaptor plate 28 (FIGS. 5 and 6) secured to the underside of the floor section 16 during the manufacture of the mobile home. The air conditioning unit 30 employed in the present system is capable of circulating conditioned air through the mobile home and is arranged to be removably received in the adaptor plate 28.

The plate 28 is conveniently located in the support area 11, as shown in FIGS. 3 and 4, between members 13 in one or more locations in the mobile home, depending on the size of the mobile home, the number of zones to be conditioned, and the preference of size and capacity of the air conditioning unit. The plate 28 is provided with an opening 32 which has a duct 33 arranged around its peripheral edge. The duct 33 as will be hereinafter explained is utilized as the air return passageway 37 for the air conditioning system. To this end it is necessary that the upper free end of the duct 33 align with the mobile home floor 26. As mentioned hereinabove, the size and more specifically the vertical dimension of the floor joists used by mobile home manufacturers may vary, accordingly by the present invention a mounting system is provided for securing plate 28 to the support structure that will allow proper positioning thereof over a wide range of floor joist dimensions.

To this end the back or rear edge of the plate 28 (FIGS. 5, 6 and 7) is provided with an upwardly projecting flange 34 which may be positioned vertically on, and secured against the outer side of support beam 15 below wall 12 of the floor section 16. The front or forward edge of the adaptor plate 28 is provided with a downwardly extending flange 35 which includes a series of elongated slots or openings 36. Secured in the slots 36 are angle or support brackets 38 which may have their upper ends secured to the floor support joist 22A when used in conjunction with the floor configuration of FIG. 5 and to cross members 23 in conjunction with the floor configuration of FIG. 6. The brackets 38 are similarly provided with a plurality of holes which, together with the slots 36, allow a great degree of vertical and longitudinal flexibility of the forward end of plate 28 with respect to the spacing and vertical dimensions of the joist 22, 22A.

The vertical flexibility of plate 28 afforded by the arrangement of the present embodiment and more specifically by the flange 35 and brackets 38 permits the use of a duct 33 having a standard or preselected axial dimension. This is especially important in that the vertical dimensions of the joist 22 used by different manufacturers may vary. It would not be practical in all instances to secure the plate 28 directly to the floor joist since the axial dimension of the duct 33 would then have to be fabricated, or if provided, modified to match joist dimensions. By employing the arrangement of the present invention the pre-dimensioned duct 33 and passageway 37 may be secured to and be an integral part of the plate 28. The plate 28 including duct 33 can then be suspended at its forward end by vertically positioning brackets 38 on joist 22A or cross members 23 as explained hereinbefore and at its rear end by vertically positioning the flange 34 on beam 15 so that the upper peripheral edge of duct 33 is arranged in an opening 39 and is adjacent the surface of floor 26. Opening 39 may be provided with a grille 41. The present mounting arrangement by providing for both horizontal and vertical adjustment relative to the mobile home floor 26 permits the use of one prefabricated mounting means 27 including adaptor plate 28 and duct 33 to be utilized over a wide range of mobile home floor configurations.

Figure 8:
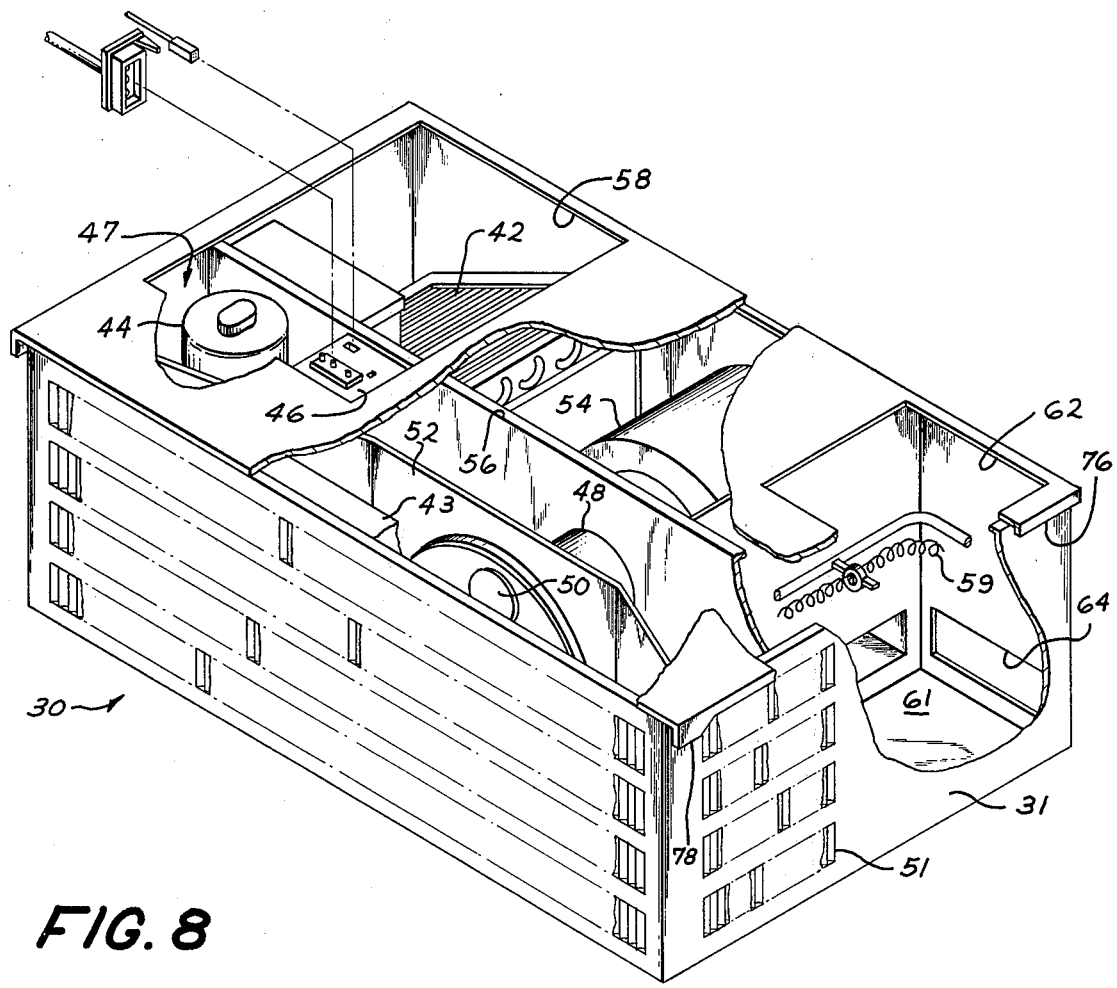
FIG. 8 is a perspective view of the air conditioning unit employed in the present system.

Referring now to FIG. 8, the air conditioning unit 30 to be used in conjunction with the mobile home 10 and its distribution system duct 24 is a self-contained unit arranged in a cabinet 31 and includes the customary refrigeration system having an evaporator section 42, condenser 43, compressor 44, power supply or control section 46, a motor 48 for driving fan 50 arranged in an opening in a barrier 52. The fan 50 moves air in through an opening 51 in the side wall of the cabinet 31 and through the condenser 43 on the other side of the barrier 52 and out through louvers arranged in the rear wall of cabinet 31. The motor 48 is of the double-shaft type and also drives a blower 54 arranged in the other side of a barrier 56 which is the main barrier dividing the cabinet 31 into the customary indoor-outdoor sections. The blower 54 draws air through a return inlet 58 arranged in the cover or upper wall of cabinet 31 through an appropriate filter 60 (FIG. 7), evaporator 42, and into a discharge chamber 61 which includes air discharge outlet 62 arranged in the upper wall and an outlet 64 arranged in the forward wall respectively of cabinet 31. The control section 46 and compressor 44 are located in a service area 47 provided between the barriers 52 and 56. The return inlet 58 as shown in FIG. 8 is dimensioned to extend beyond the barrier 56 to permit access to the service area 47. As will be explained hereinafter, the choice of outlets 62, 64 will be based on which type of floor construction 16 the mobile home includes and the adaptor plate 28.

The air conditioning unit 30 used in conjunction with the present embodiment of the present invention may be of the type that provides both cooling and heating, in which event the mobile home heating furnace may not be installed or used. In order to supply heated air to the mobile home the air conditioning unit may be of the reverse cycle, heat pump type or alternately as shown in FIG. 8 a resistance heater 59 may be arranged in the path of discharge air in the chamber 61. It should be understood that when the air conditioning unit provides both cooling and heating, a heating furnace may not be supplied and the air distribution duct 24 may be segmented depending on the number of air conditioning units used and the number or locations of the zones. As will be hereinafter explained in detail, the air conditioning unit 30 is controlled by a temperature responsive thermostat means 63 arranged conveniently in one of the mobile home zones 17.

The aligning means 27 and more specifically the adaptor plate 28, used in the floor section construction shown in FIGS. 2, 3 and 5, is provided with the airreturn opening 32 arranged to communicate with the interior of the mobile homes and an air outlet 66. It will be noted that the opening 32 aligns with opening 58 while opening 66 aligns with opening 62 when the air conditioning unit is fully located in the adaptor plate 28. In this embodiment, the air conditioning outlet 64 is not employed and is covered with an appropriate plate or cover 68.

To properly insure the alignment of the openings 32 with 58 and opening 62 with 66, the adaptor plate 28 is provided with a depending track or support means 72 projecting downwardly along the parallel side walls of the plate 28. The track 72 is provided with a raceway 74 formed to receive a guide member 76 (FIGS. 5, 6 and 8) projecting from the upper side edges of the upper wall of the air conditioning unit cabinet 31. The raceway 74 is formed so that it inclines upwardly from the flange 34 end of the plate 28. The guide member 76 has a downwardly projecting cam member 78 formed on its trailing edge.

In operation, that is during the insertion of the air conditioning unit guide member 76 into the raceway 74 of the support member 72, the leading or forward edge of the guide member 76 rides upwardly in the raceway 74 toward the underside of the plate 28 with the cam member 78 engaging the open rear end of the raceway 74 just prior to the complete insertion of the air conditioning unit 30. During the last portion of the insertion process, the cam member 78 rides up into the raceway 74 causing the rear or trailing end of the air conditioner to be raised as it is completely inserted into the raceway 74 so that the top wall of the cabinet 31 is parallel to and against the plate 28 with the appropriate openings 58, 32 and 62, 68 engaged in a sealed air transfer position.

The aligning means 27 also includes air communication means for delivering air from the aligned outlets 62, 66 to the distribution system main duct 24. To this end (FIG. 5), during construction of the mobile home the outlet 66 of plate 28 is connected through an air conduit or passageway means 86 to an opening 88 on the upper wall of the air distribution system main duct 24. It should be noted that in this type of mobile home construction the air conduit 86 is located between transversely arranged floor joists 22A and across the top of support member 19. The duct 24 and conduit 86 like the plate 28 are installed during the construction of the mobile home. As can readily be understood the conduit 86 provides a means for aligning the opening 66 in plate 28 of aligning means 27 and more specifically, the air conditioning air outlet 62 with the distribution system duct 24 so that cooled air from the air conditioner may be delivered through duct 24 into selected zone or zones to be cooled through appropriate opening 25, while the duct 33 provides means for aligning the air conditioner air return inlet 58 with the opening 39 in the selected zone to complete the recirculation of air through the selected mobile home zone.

The aligning means 27, and more specifically, the adaptor plate 28, employed in the floor construction of the mobile home 10 shown in FIGS. 4, 6 and 7, provides means for connecting the air outlet 64 of the air conditioner unit 30 into communication with the air distribution duct 24. It should be apparent that the longitudinal arrangement of joists 22 in this type of construction precludes the positioning of a conduit for connecting the air conditioning unit with the mobile home air distribution system across the top of the beam 19. Accordingly the air communication means from the air conditioner air delivery outlet to the air distribution system duct 24 is arranged to extend across the bottom of support member 19.

To this end, the aligning means 27 provides a bulkhead or plate 90 which includes an opening 92 secured to the flange 35. The plate 90 extends downwardly so that the opening 92 is located near or below the lower edge of beam 19.

Further, in this type mobile home construction, communication between the air conditioning unit 30 and duct 24 is effected by an air conduit means 94. The conduit 94 extends from the opening 92 across the bottom edge of beam 19 and then upwardly to an opening 96 in the mobile home air distribution duct 24. Alternatively the opening 64 in the cabinet 31 may be located in the side wall and the plate 90 arranged adjacent the side wall with duct 94 extending across the bottom of beam 19 as hereinbefore described.

Means are provided to support and position the duct 94 on the beam 19 so that duct 94 is axially aligned with opening 92 on the plate 90. Accordingly, the duct 94 rests and is supported on the bottom wall portion of a U-shaped sleeve member 100. The upper ends of the side wall portions 101 of the sleeve 100 are provided with outwardly projecting flanges 102. The sleeve 100 is secured to the beam 19 by a pair of clamps 104 that are secured to each of the flanges 102 and are appropriately shaped to engage the lower oppositely projecting leg portion of the I-beam 19. This clamping arrangement provides longitudinal adjustment along the I-beam 19 while the placement of the clamps 104 in appropriate holes arranged in the flanges 102 provides horizontal axial adjustment relative to opening 92. The sleeve 100 is secured in appropriately selected openings in a vertically arranged flange 106 formed in the plate 90 to support the aligned conduit 94 between the bottom wall of sleeve member 100 and the beam 19. As can readily be understood the conduit 94 provides a means for aligning the opening 92 in plate 90 of the aligning means 27 and more specifically the air conditioning air outlet 64 with the distribution system duct 24.

In summary it should be apparent from the foregoing description that an air conditioning system and method are provided for air conditioning a mobile home that includes installing a mounting means during construction of the mobile home for adapting the mobile home to removably receive a self-contained air conditioning unit. The mounting means includes air communication means for connecting the air conditioner in air communication with the distribution system duct of the mobile home. The arrangement of securing the adaptor plate 28 in accordance with the present embodiment permits proper alignment of the passageway 37 relative to the mobile home floor while insuring that the plate 28 is in a horizontal plane that enables the efficient operation of the support and track members.

While there has been shown and described a specific embodiment of the invention, it will be understood that it is not limited thereto and it is intended by the appended claims to cover all such modifications as fall within the true spirit and scope of the invention.

I claim:

1. An air conditioning system including a mobile home having at least one zone to be air conditioned and a base structure including an interior floor and having longitudinally extending spaced parallel support beams being located inwardly of the outer walls of said mobile home for providing a support area therebetween, distribution means being located between said support beams, said system comprising:
   an air conditioning unit being adapted to be removably attached to said mobile home, including a cabinet having air moving means, an air delivery outlet, and air return outlet in the top wall of said cabinet;
   said air distribution means including at least one air inlet for receiving air from said air conditioning unit and air outlet for delivering air into said mobile home zone;
   mounting means including an adaptor plate attached to said base structure in said support area for removably receiving said air conditioning unit including a first opening aligned with said air conditioning air delivery outlet and a second opening in alignment with said unit's air return outlet when said unit is located in said mounting means;
   a first passageway positioned around the peripheral edge portion of said second opening extending upwardly from said plate;
   means on the rear edge portion of said adaptor plate being vertically positioned on said mobile home base structure relative to said floor; and
   support elements secured between said adaptor plate and said base structure forward of said means on the rear edge of said adaptor plate for positioning said adaptor plate horizontally relative to the mobile home floor and vertically so that the upper free peripheral edge of said first passageway is adjacent the mobile home interior floor.

2. The air conditioning system according to claim 1 wherein:
   said means formed on the rear edge portion of said adaptor plate is an upwardly projecting flange being vertically positioned on the lower edge portion of said mobile home outer wall.

3. The air conditioning system according to claim 1 wherein:
   a flange is provided on the forward edge portion of said adaptor plate; and
   said support elements are arranged between said flange and floor joist located on said support beams.

* * * * *